(12) United States Patent
Taya et al.

(10) Patent No.: US 7,823,467 B2
(45) Date of Patent: Nov. 2, 2010

(54) TACTILE SENSORS

(75) Inventors: Minoru Taya, Mercer Island, WA (US); Jin Wang, Seattle, WA (US); Chunye Xu, Seattle, WA (US); Yasuo Kuga, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 12/330,396

(22) Filed: Dec. 8, 2008

(65) Prior Publication Data

US 2009/0165569 A1 Jul. 2, 2009

Related U.S. Application Data

(60) Provisional application No. 61/012,370, filed on Dec. 7, 2007.

(51) Int. Cl.
*G01L 1/10* (2006.01)
*G01L 1/22* (2006.01)
*G01L 3/00* (2006.01)
*G01R 3/00* (2006.01)

(52) U.S. Cl. .............. 73/862.625; 73/862.041; 73/862.042; 73/862.046; 29/595

(58) Field of Classification Search ................. 73/862.041–862.046, 862.625, 862.68; 29/595
See application file for complete search history.

(56) References Cited

U.S. PATENT DOCUMENTS

| 4,378,478 A | * | 3/1983 | Deeg | 200/515 |
| 5,230,921 A | * | 7/1993 | Waltonen et al. | 427/100 |
| 5,261,266 A | * | 11/1993 | Lorenz et al. | 73/1.15 |
| 5,747,546 A | * | 5/1998 | Sorenson et al. | 521/32 |
| 6,809,462 B2 | * | 10/2004 | Pelrine et al. | 310/319 |
| 6,886,415 B1 | * | 5/2005 | Kurogi et al. | 73/862.045 |
| 2002/0061117 A1 | * | 5/2002 | Takewa et al. | 381/430 |
| 2002/0130673 A1 | * | 9/2002 | Pelrine et al. | 324/727 |
| 2008/0087075 A1 | * | 4/2008 | Creaven et al. | 73/61.41 |

OTHER PUBLICATIONS

Wang, Jin, Chunye Xu, Minoru Taya, and Yasuo Kuga. "A Flemion-based actuator with ionic liquid as solvent," Smart Mater. Struct. 16 (2007) S214-S219.

Wang, Jin, Chunye Xu, and Minoru Taya. "Mechanical stability optimization of Flemion-based composite artificial muscles by use of proper solvent," J.Mater.Res., vol. 21, No. 8, Aug. 2006, pp. 2018-2022.

* cited by examiner

*Primary Examiner*—Lisa M Caputo
*Assistant Examiner*—Jonathan Dunlap
(74) *Attorney, Agent, or Firm*—Ronald M. Anderson

(57) ABSTRACT

An electroactive polymer is used to produce a tactile sensor. The electroactive polymer (EAP) includes a sheet of an ion-exchange membrane having opposite surfaces on which are plated gold electrodes. The EAP is formed to have a dome-shape with a plurality of sensing electrodes circumferentially disposed around an outer surface of the dome. A flexible polymer underlying the EAP supports it and prevents a force applied to the tactile sensor from inverting the dome. The sensor electrodes produce separate output signals indicative of different vector components of an applied force acting on the tactile sensor, so that a direction of the force can be determined. Vias provided in the electrodes are electrically coupled to a flexible circuit that conveys the output signals externally from the sensing electrodes for use and further processing. A plurality of the tactile sensors can be formed as an array on an ion-exchange membrane.

33 Claims, 10 Drawing Sheets

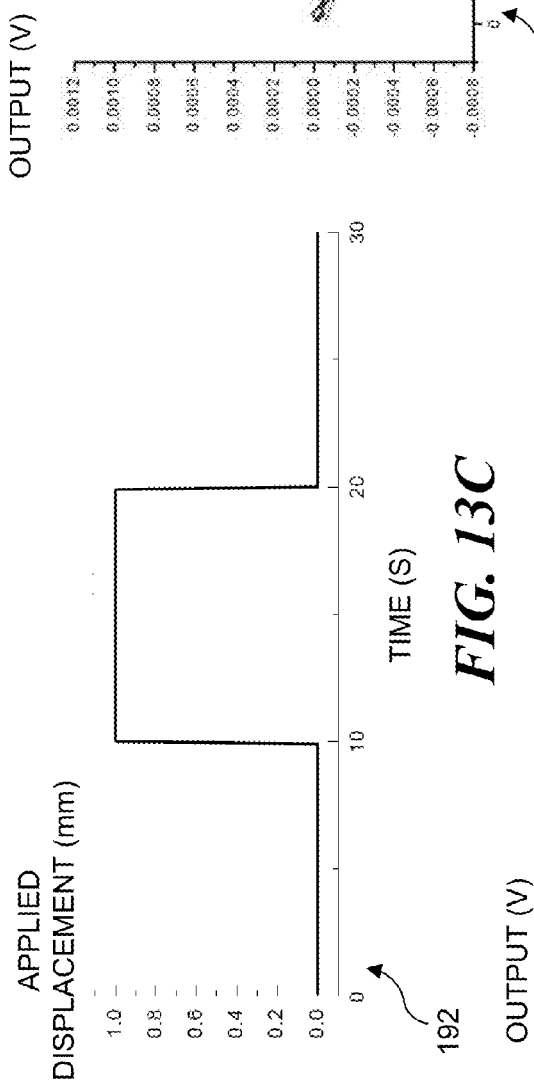
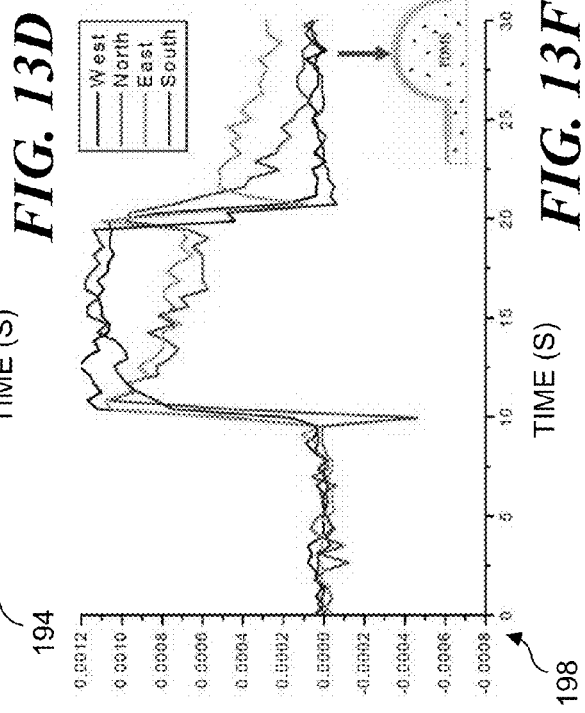
FIG. 13C
FIG. 13D
FIG. 13E
FIG. 13F

TACTILE SENSORS

RELATED APPLICATIONS

This application is based on a prior copending provisional application, Ser. No. 61/012,370, filed on Dec. 7, 2007, the benefit of the filing date of which is hereby claimed under 35 U.S.C. §119(e).

GOVERNMENT RIGHTS

This invention was made with government support under grant numbers ECS-0424414 and ECS-0218805 awarded by the National Science Foundation. The government has certain rights in the invention.

BACKGROUND

The cells of plants and most of the epidermal (skin) cells of animals are capable of sensing mechanical touch, to which they respond by producing a complex electrical signal. When an improved capability for sensing mechanical touch is essential for the functioning of an organ, the sensitivity may be enhanced by surface extrusions in the form of either sensory hairs, such as are found on the upper side of the leaf pair of the Venus flytrap and the lower part of leaf joints of *Mimosa pudica*, or the sensory papillae that are found on the surface of tendrils in some species of *Cucurbita* (a plant family commonly known as melons, gourds or cucurbits) and *Passiflora* (a plant family commonly referred to as passion vines). Instead of distributing the enhanced sensitivity over many cells, these structures focus the response to a touching force so that it occurs on the surface area of only one cell—the sensor cell—and thus, amplify the resulting hydraulic pressure developed by an applied force.

A close look at sensory papillae (small projections on leaf or vine surfaces) of such plants (for example, papillae 24 that are shown on a trichome 22 in a scanning electron micrograph 20 in FIG. 1), reveals that this mechanosensor is not just a pressure sensor capable of sensing pressure (or force) applied only along the direction perpendicular to the surface of the plant tissue (i.e., in the direction designated by a vector $F_z$), but also has a capability of sensing forces applied in other directions, i.e., forces that are incident on the surface of the generally dome-shaped papillae at small acute or obtuse angles (see, for example, a model 26 of a plant tactile sensing papilla dome structure 28 shown in FIG. 2). Therefore, these mechano or tactile sensors in certain plants can sense the surface topology of a foreign object that touches the sensors. This tactile sensitivity can help plant tendrils, such as on cucumber vines, search for stable objects with rough surfaces so that the tips of the tendrils can grab the objects that are contacted, coiling around the objects for support, enabling the plant vines to spread more efficiently.

The mechanisms inherent in the sensory papillae of the Cucurbitaceae plant family appear to be driven by both hydrated ion motion and stretch/contraction and/or re-orientation of fibrils embedded in the sensor cells. The former mechanism is referred to as "hydrated ion motion," and the latter as "tensegrity network motion," where a number of fibrils form a connected network. Thus, any mechanical stimulus at one location can transduce a signal through the network of the fibril microstructure. Accordingly, it might be desirable to employ an analogue of the hydrated ion motion mechanism inherent in the sensor cells of plants, in the design of man-made tactile sensors.

Man-Made Tactile Sensors

Most man-made tactile sensors can detect pressure from only one direction. For example, a typical tactile sensor may include a cantilever that responds to a force that deflects the distal end of the cantilever. In contrast, the tactile sensors in certain plants can detect "vector" forces, i.e., can react to the direction of an applied force that may be applied from any of a number of different directions. A comparison between the natural hair sensors in the plant known as the Venus Fly Trap, and the sensor cells in Cucurbitaceae indicates that the former can sense only forces directed along one of two orthogonal directions, $F_x$ or $F_y$, while the latter senses the components of forces directed along a plurality of orthogonal directions, i.e., $F_x$, $F_y$, and $F_z$. In this sense, the natural tactile sensor of the papillae in Cucurbitaceae possesses a well-developed sensor microstructure, and its distributed pattern on the surfaces of vines and leaves comprises a good design for an arrayed tactile sensor system useful for identifying the orthogonal components of applied forces so as to determine the direction of the force.

Most of the man-made tactile sensors that have been developed so far are based on piezoelectric sensing elements covered by an elastomeric top coating, or on piezo-resistive elastomers. Both types of sensors are useful for measuring pressure distribution in a robotic hand, where constant electric power can be applied to the sensors during the time they are employed for sensing force. However, such sensors will require either a fixed source of power or a portable battery supply, which can limit their usefulness. It would be preferable if new types of tactile sensors might be developed that do not require any power supply, yet can provide a full set of sensing signals in response to applied mechanical forces.

Other currently available commercial sensors are based on silicon-micro-electrical mechanical systems (MEMS) technology that exhibit a touch sensitivity that is not very linear, or on conducting polymers made of conductive fillers and elastomers having a touch sensitivity that is more linear than that of Si-MEMS, but relatively low in sensitivity.

The response to force by a tactile sensor should not be limited to only a force applied in the direction, but instead, the sensor should also respond to force components in all of the orthogonal directions, i.e., to force components $F_x$, $F_y$, and $F_z$. Again, it would be desirable to generally duplicate in a man-made tactile sensor, the ability to sense the direction of an applied force, like the papillae sensors in certain plants.

Materials that may be useful in providing such tactile sensors include electroactive polymers (EAP) made with ion-exchange membrane materials such as Nafion™ and Flemion™. Nafion™, which was originally developed for use in reverse osmosis desalination by DuPont, was first used as an actuator material by the Oguro group at the Osaka National Research Institute, Japan, in 1992, which determined that it deforms in response to an applied voltage. Following the pioneering work by Oguro et al., a number of other researchers have continued to study the uses of EAPs. For example, mechanical-actuators based on EAPs have also been developed using Flemion™, and polyvinyl alcohol (PVA). Like Nafion™, Flemion™ was originally developed as an ion-exchange membrane, with application to fuel cell technology, but was subsequently shown to be useful in actuators.

Recently, a charge sensing model has been developed that is based on proportionality between stress and charge density. This model predicts that an induced stress will produce a capacitive discharge in a polymer, such as an EAP, and the prediction has been verified through a series of experiments. By monitoring the voltage of the discharge that is produced, the EAP can produce an indication of applied force and can be used as a tactile sensor. This work was initially carried out using an EAP constructed with Nafion™. However, the relatively low durability of a tactile sensor based on Nafion™ would limit it to a very short useful life. Therefore, it is clear that more durable EAP-based tactile sensors would be favored, because of their sensitivity, flexibility, ease of fabrication, and low cost. In addition, because a source of electrical power is not required to energize EAP tactile sensors during the sensing process, an EAP-based device would have minimal energy consumption, making it very useful in applications in which the sensor cannot be continuously connected to a power supply while needed for tactile sensing.

SUMMARY

As noted above, certain plants have the ability to use generally dome-shaped tactile sensors to determine the direction of an applied force that stimulates the plant tactile sensor. Accordingly, much like the tactile sensor used by plants, a tactile sensor has been developed that is capable of determining a direction from which a force is applied. This man-made tactile sensor includes an electroactive polymer having an ion-exchange membrane formed into a convex dome shape. This convex dome has an outer surface and an inner surface. A plurality of flexible electrodes are disposed on the outer surface of the ion-exchange membrane and are configured so that each of the plurality of flexible electrodes covers a different circumferential segment of the outer surface of the convex dome. A base flexible electrode is disposed on the inner surface of the ion-exchange membrane. A plurality of electrical conductors are electrically connected to the plurality of flexible electrodes and to the base flexible electrode and are used to convey output signals from the plurality of flexible electrodes and the base flexible electrode. A distortion of a segment of the ion-exchange membrane caused by a force applied to the flexible electrode covering the segment causes the segment of the ion-exchange membrane to produce an output signal indicative of a magnitude of the force. Relative differences in the output signals conveyed from the flexible electrodes covering the different segments of the convex dome are further indicative of a direction of the force acting on the tactile sensor, i.e., the direction of a vector representing the force.

An elastomeric support can be disposed within a concave cavity formed under the convex dome. The elastomeric support then prevents a force applied against one or more of the plurality of flexible electrodes disposed on the outer surface of the convex dome from inverting the ion-exchange membrane from its convex shape to a concave shape. In one exemplary embodiment, the elastomeric support comprises a poly (dimethyl siloxane) substrate.

The ion-exchange membrane can consist of a membrane made from either a perfluorinated carboxylic acid membrane within a sodium salt, or a perfluorosulfonic acid membrane with a counter ion.

In at least one exemplary embodiment, the plurality of flexible electrodes and the base flexible electrode comprise a metallic film that is substantially chemically inert and which is plated onto the outer surface (to form the plurality of flexible electrodes) and on the inner surface of the ion-exchange membrane (to form the base flexible electrode). The metallic film can be bonded to the ion-exchange membrane by forming a fractal microstructure of the metallic film within the surfaces of the ion-exchange membrane.

A flexible protective coating can be applied over the plurality of flexible electrodes, to enhance the durability of the tactile sensor. This protective coating can comprise a polymer film that is biocompatible, so that the tactile sensor can be used inside the body of a patient or can remain in contact with biological tissue without adversely affecting the tissue.

The tactile sensor can be one of a plurality of substantially identical tactile sensors that are disposed in an array on a supporting substrate. Such an array can then be used to sense the shape of an object that contacts the array, based on the output signals from the plurality of electrodes comprising the tactile sensors on which the object exerts a force. The tactile sensor (whether only one or a plurality) can include vias that electrically couple the plurality of flexible electrodes and the base flexible electrode to a flexible circuit disposed adjacent to the supporting substrate.

In at least one exemplary embodiment, the ion-exchange membrane includes an organic solvent and a non-aqueous electrolyte, which extend a usable lifetime of the tactile sensor in a substantially dry environment. Ideally, the ion-exchange membrane is characterized by producing a generally consistent and repeatable output signal in response to cyclically repetitive applications of a force deflecting the electroactive polymer. Furthermore, the ion-exchange membrane can be characterized by producing a substantially constant magnitude output signal for a substantially constant force applied to deflect the electroactive polymer.

Another aspect of this novel approach is directed to a method for producing a tactile sensor that enables a direction in which a force is applied to the tactile sensor to be determined. In the method, flexible electrodes are applied on opposite first and second surfaces of an ion-exchange membrane. Each flexible electrode defined on the first surface of the ion-exchange membrane is configured to cover a different region of a plurality of regions. The flexible electrodes and the ion-exchange membrane comprise an electroactive polymer. The electroactive polymer is molded to form a convex dome in which the plurality of different regions covered by the plurality of flexible electrodes comprise different circumferential segments that are generally arranged radially around the convex dome. Electrical conductors connected to the plurality of the flexible electrodes on the first surface of the ion-exchange membrane and to a flexible electrode on the second surface of the ion-exchange membrane are operative to convey output signals from the different circumferential segments in response to a deformation of one or more circumferential segments by a force applied against the convex dome.

The method can further include the step of applying a flexible biocompatible protective coating over the tactile sensor, enabling the tactile sensor to remain in contact with tissue without adversely affecting the tissue, and enhancing a durability of the tactile sensor.

The method can also include the step of providing a generally dome-shaped elastomeric support underlying the convex dome and the flexible electrode that covers the second surface of the ion-exchange membrane. The elastomeric support prevents the ion-exchange membrane from inverting when a force is applied to deflect it. The elastomeric support can be molded from poly(dimethyl siloxane).

An ion-exchange polymer can be employed to fabricate the ion-exchange membrane in this method. The ion-exchange polymer can be either a perfluorinated carboxylic acid membrane within a sodium salt, or a perfluorosulfonic acid membrane with a counter ion.

The step of applying the flexible electrodes can include the step of plating a substantially chemically inert metallic film onto the first surface and onto the second surface of the ion-exchange membrane. A pattern stencil can be used to define the different regions where the conductive metallic film is plated onto the first surface of the ion-exchange membrane to form the flexible electrodes. The metallic film can be bonded to the ion-exchange membrane by forming a fractal microstructure of the metallic film within the first and second surfaces of the ion-exchange membrane. As an alternative to plating using a stencil, the different regions can be defined by cutting slots through the metallic film comprising each of the flexible electrodes after the conductive metal is applied to the first surface of the ion-exchange membrane. The slots electrically separate the flexible electrodes covering the different regions of the ion-exchange membrane from each other.

The step of molding the electroactive polymer can include the steps of positioning the electroactive polymer within a mold between a first mold surface having a convex shape and an opposite second mold surface having a corresponding concave shape, and applying pressure against the mold, while heating the mold. The pressure forces the first and the second mold surfaces toward each other to shape the electroactive polymer into the convex dome shape. Similar steps can be employed for fabricating a plurality of spaced-apart tactile sensors on the same ion-exchange membrane, thereby forming an array of the tactile sensors on a supporting elastomeric substrate. For each of the plurality of tactile sensors in the array (or for a single such sensor), the step of forming electrical connectors can include the step of forming vias that electrically couple the plurality of flexible electrodes on the first surface with a flexible circuit disposed adjacent to the supporting elastomeric substrate.

The method can further include the step of creating the ion-exchange membrane with an organic solvent and a non-aqueous electrolyte, to extend a usable lifetime of the tactile sensor in a substantially dry environment.

Yet another aspect of the present novel technology is directed to a method for sensing a direction in which a force is applied to a tactile sensor. The method includes the step of providing a generally dome-shaped tactile sensor having a plurality of sensing regions disposed around the surface of the dome-shaped tactile sensor. Each sensing region produces an output signal indicative of a deformation of the sensing region caused by a vector component of an applied force. Another step provides for automatically processing the output signals to determine the direction in which the force was applied to the dome-shaped tactile sensor. Other details of this method are generally consistent with the functionality discussed above in connection with the tactile sensor.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 5:
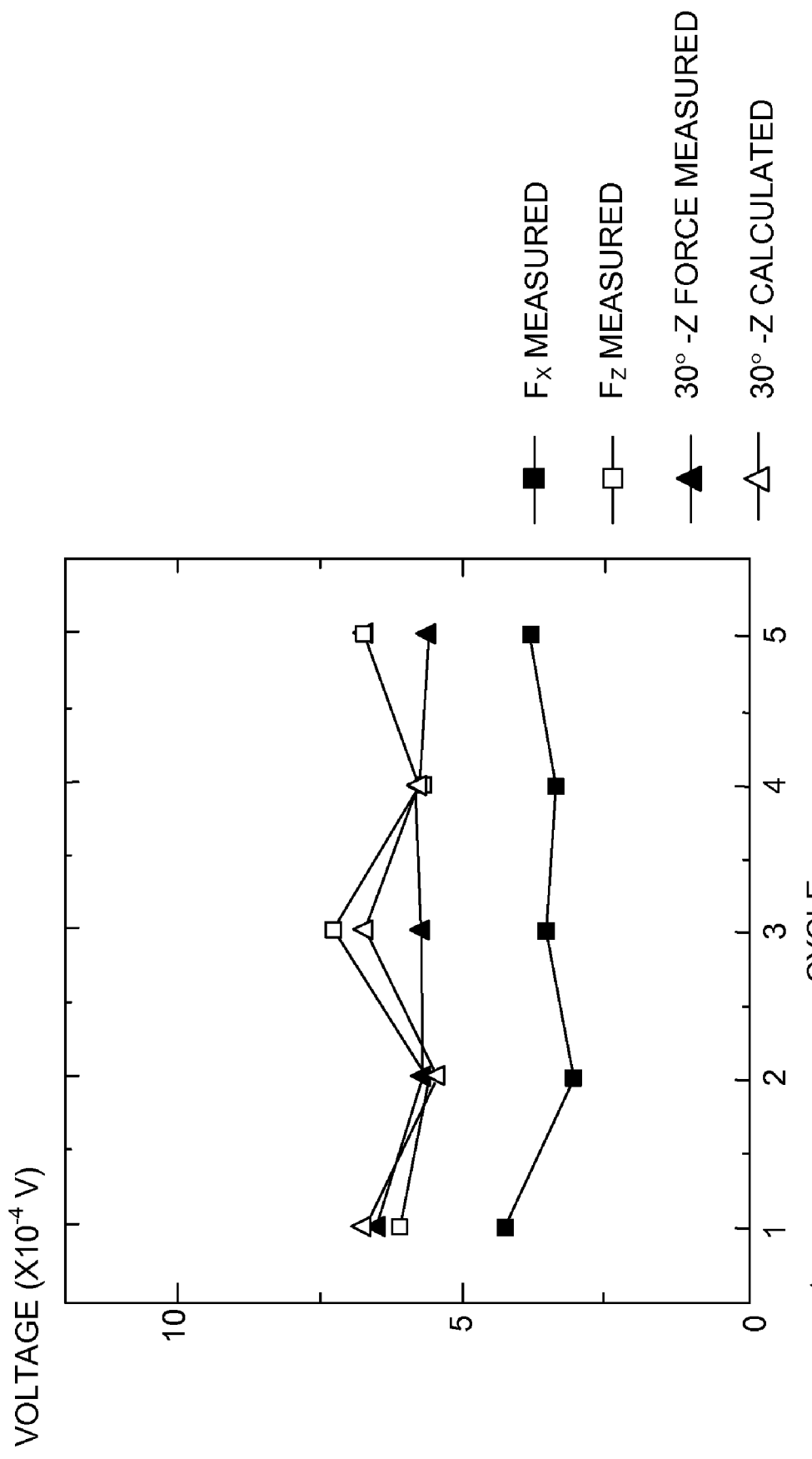
Figure 6A:
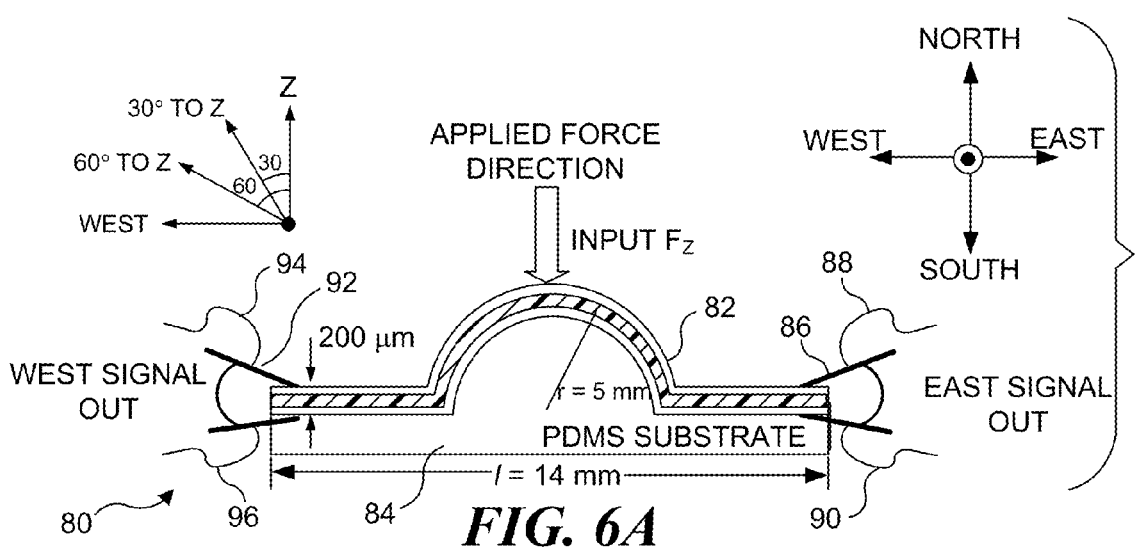
Figure 6B:
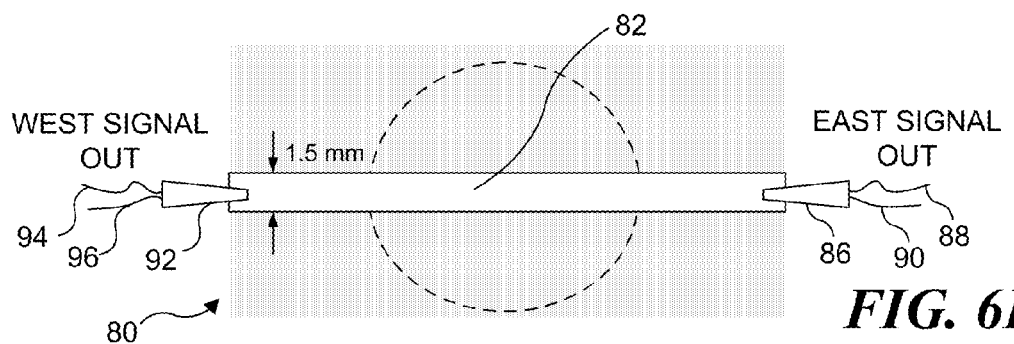
Figure 7:
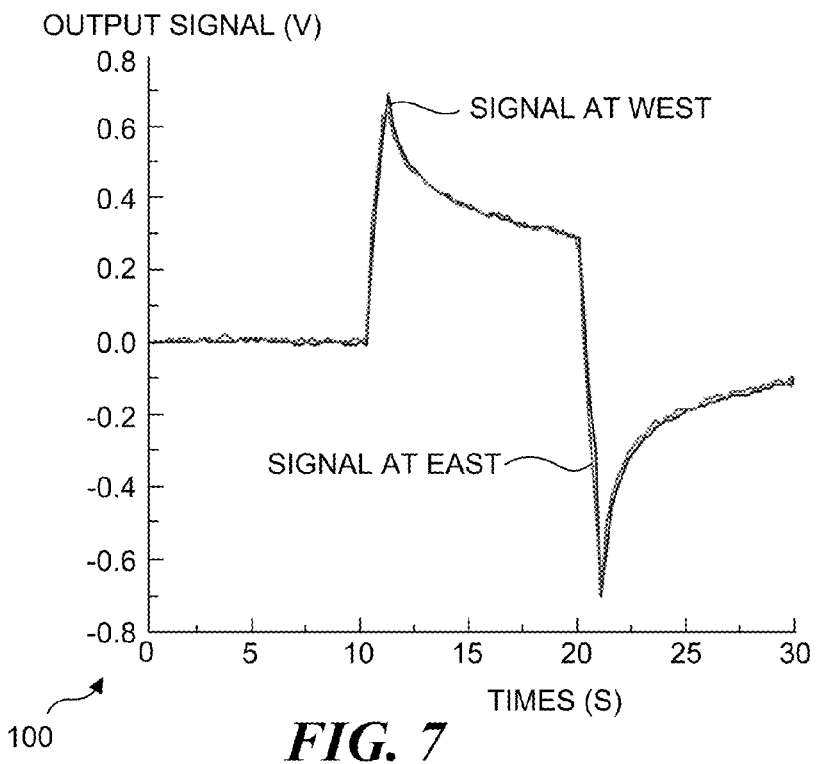
Figure 8A:
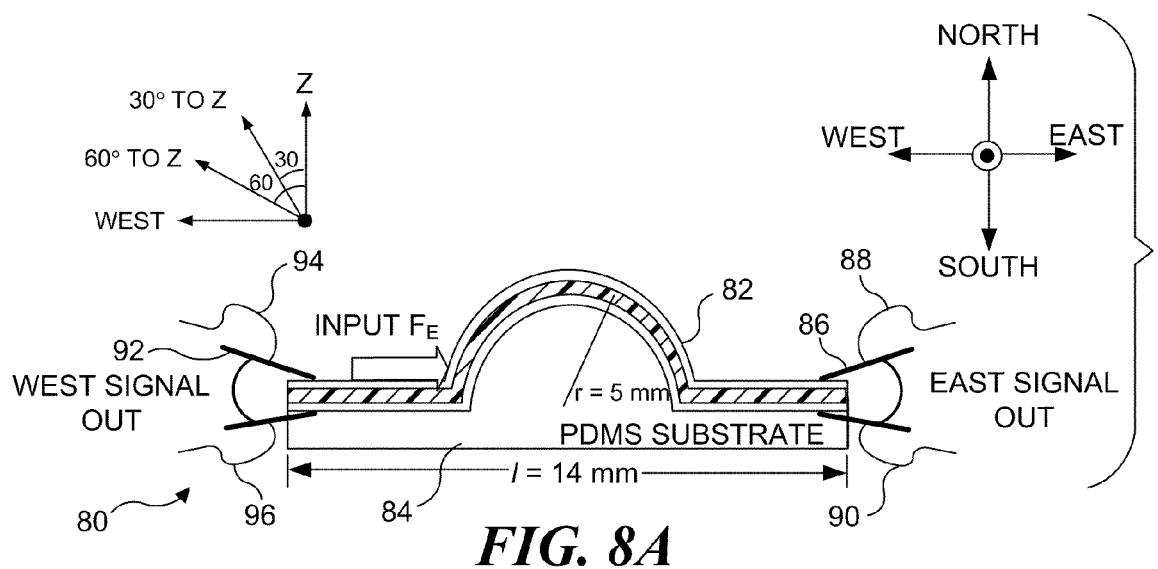
Figure 8B:
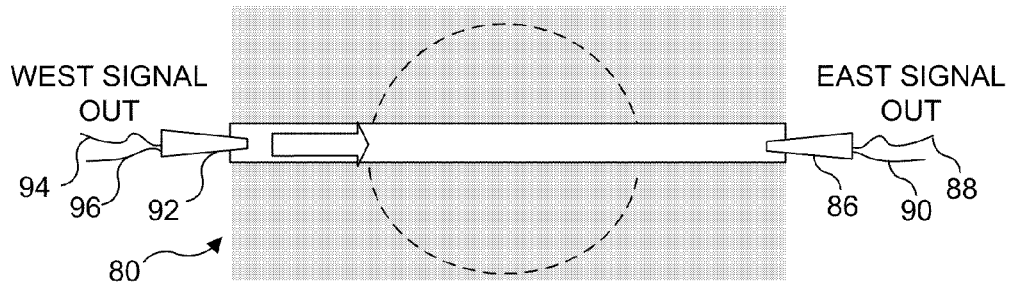
Figure 9:
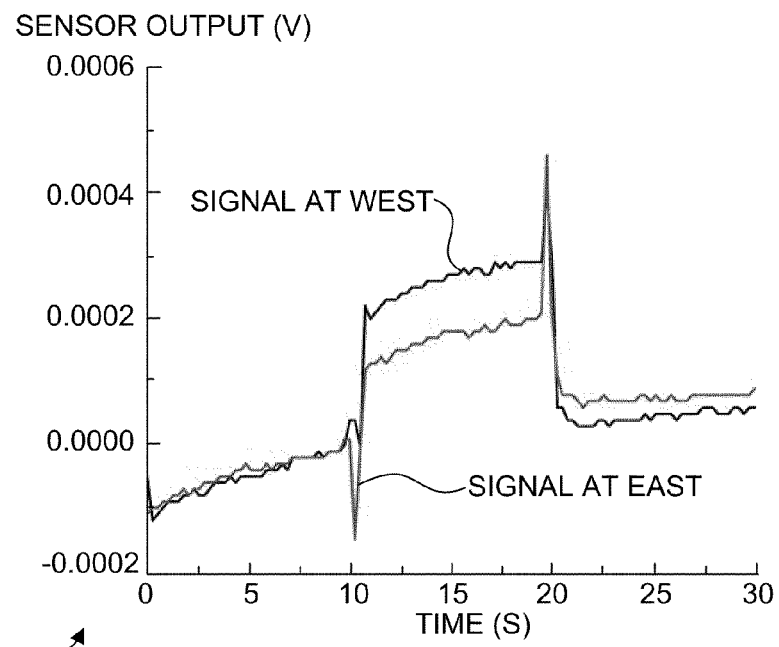
Figure 10A:
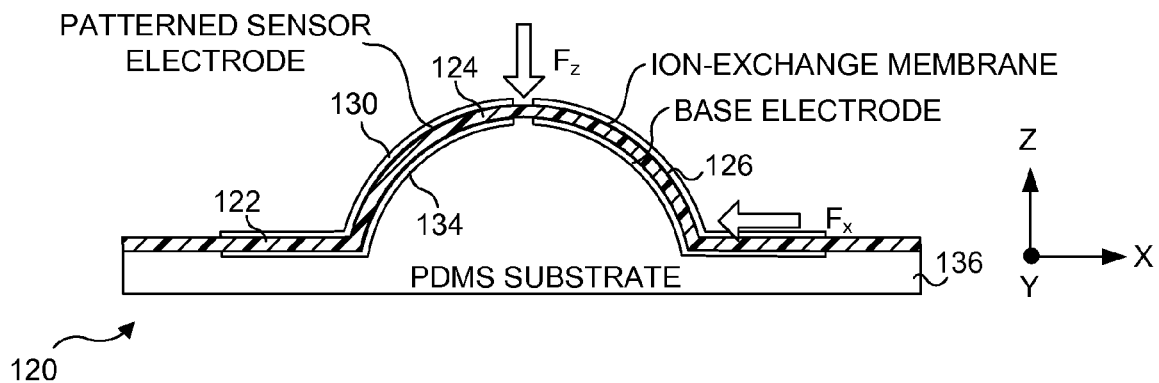
Figure 10B:
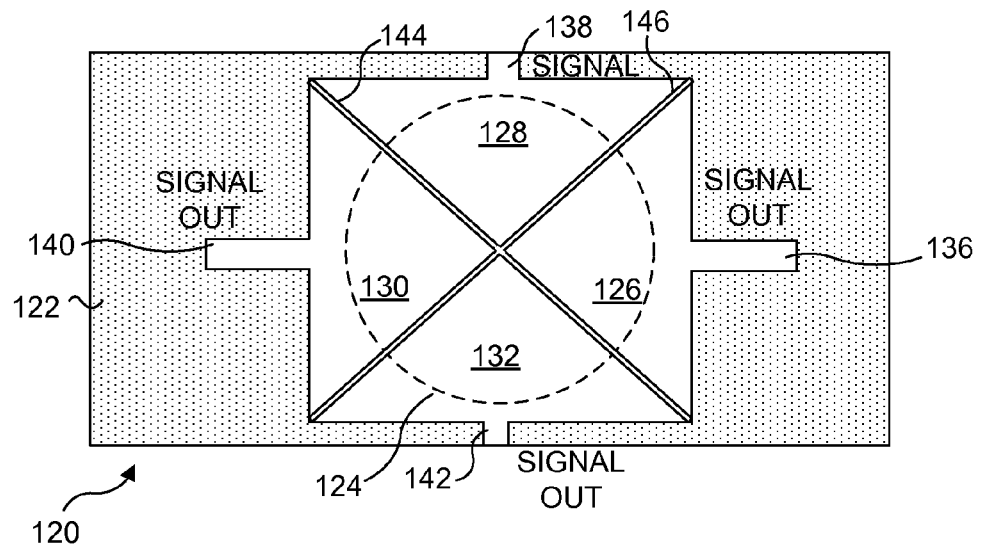
Figure 11:
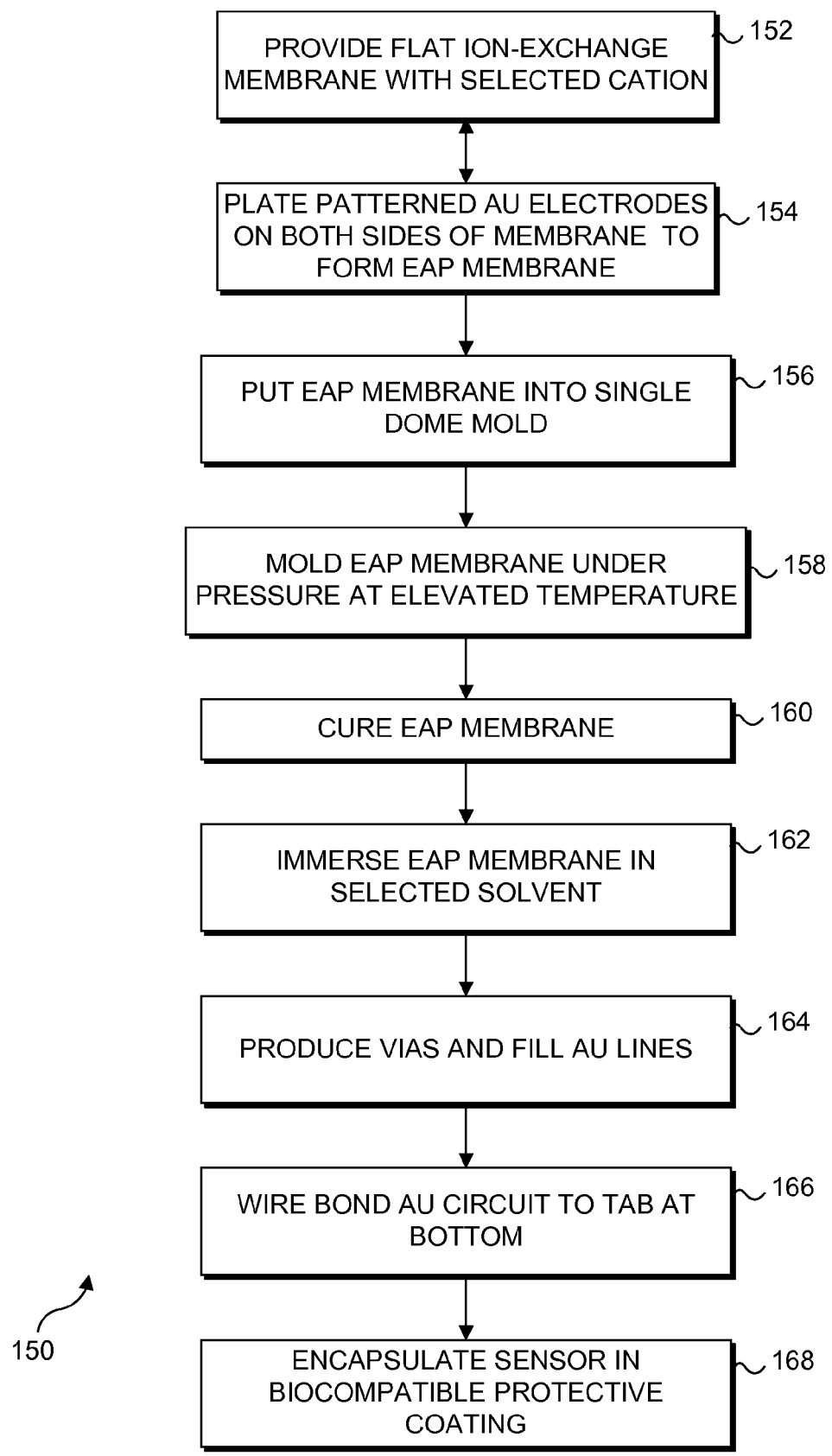
Figure 12:
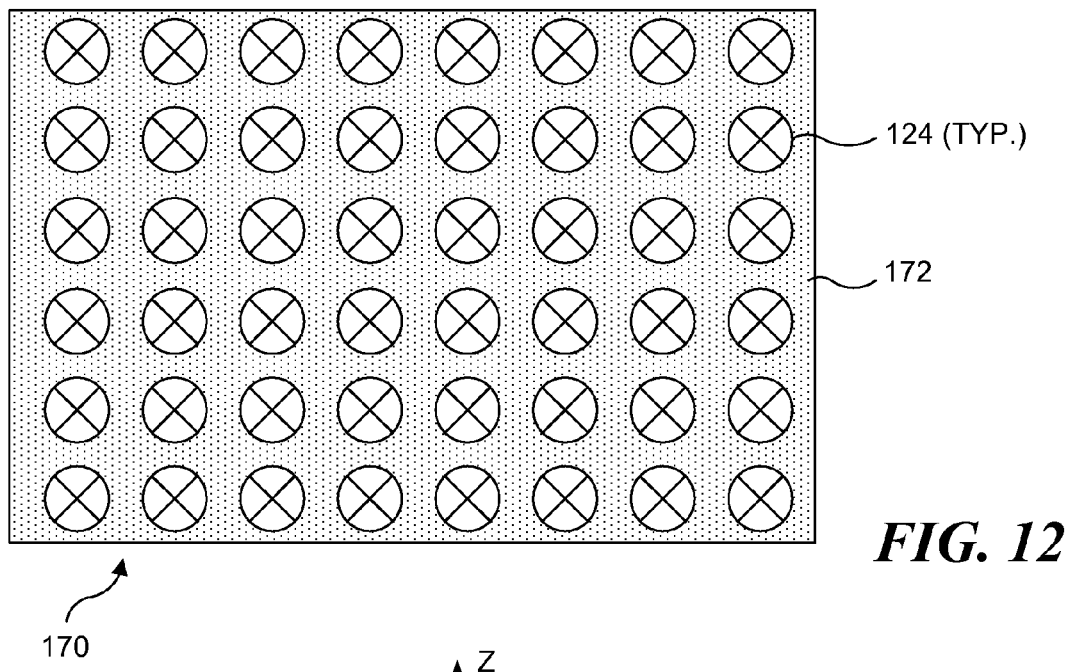
Figure 13A:
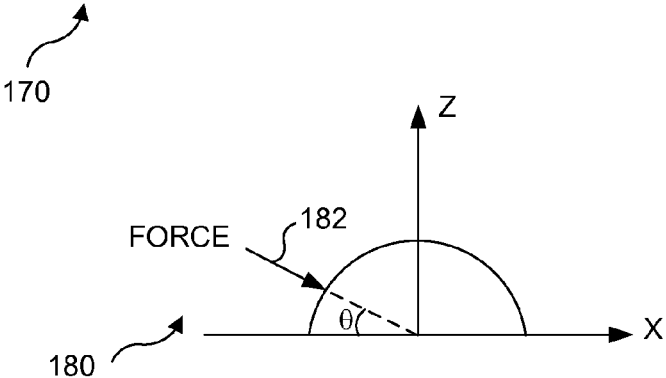
Figure 13B:
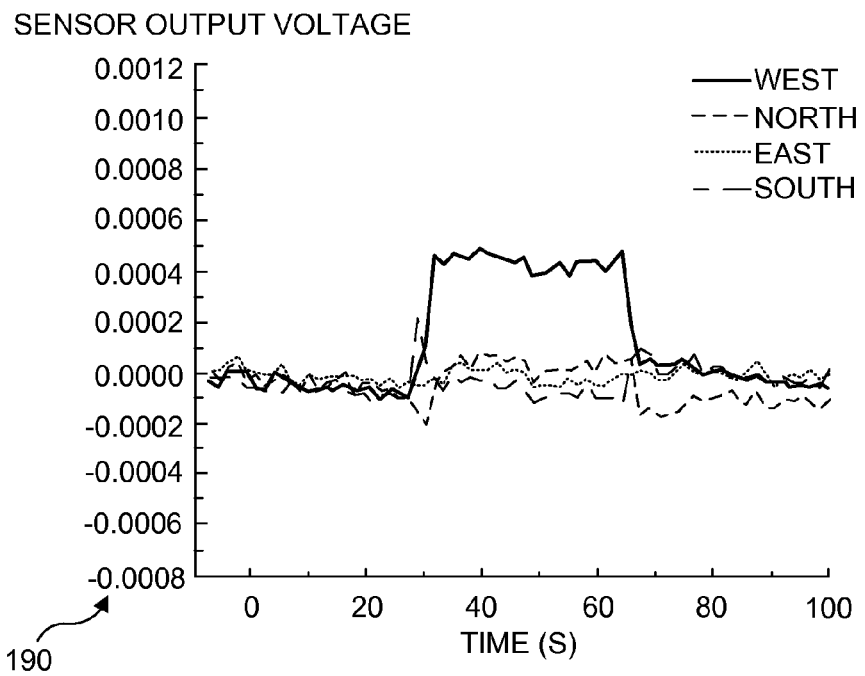
Figure 14:
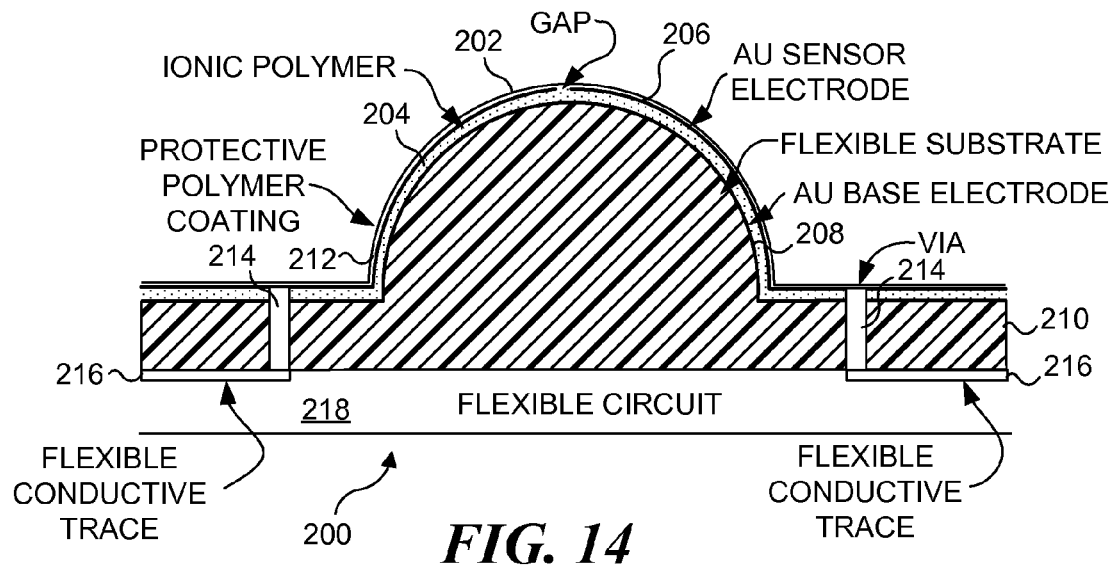
Figure 15:
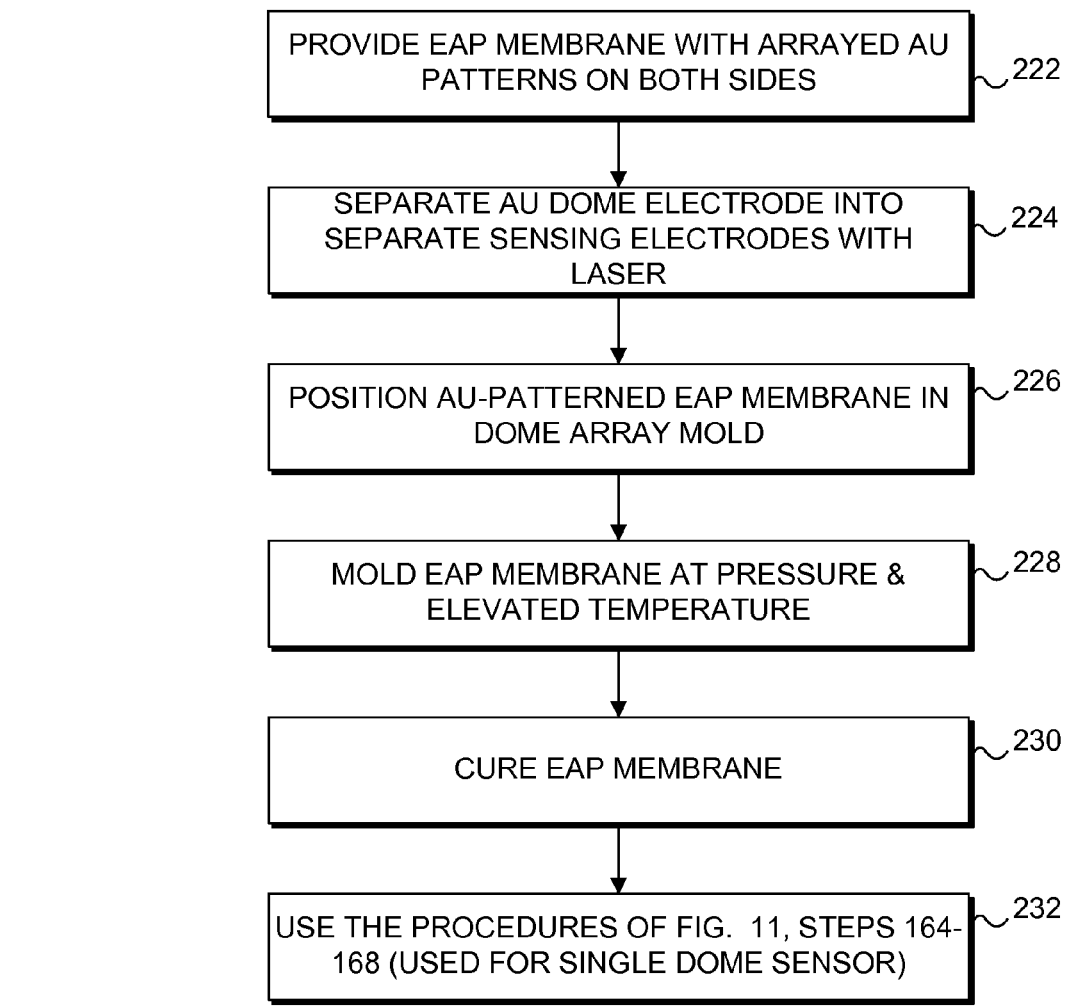

FIGS. 4A, 4B, 4C, and 4D are graphs respectively showing a cyclical displacement of sensor over time, a cyclical force applied to cause the displacement of the sensor over time, a voltage response to the cyclical displacement for Nafion™, and a voltage response to the cyclical displacement for Flemion™;

FIG. 5 is a graph showing the voltage response of Flemion™ for both experimental and predicted values of output signals for an inclined force cyclically applied to a tactile sensor in different directions;

FIGS. 6A and 6B are respectively a cross-sectional view, and a top plan view of a tactile sensor comprising Flemion™ molded in a dome shape and supported by a dome-shaped PDMS substrate, including leads coupled to the Flemion™ membrane on a west and east side of the dome to monitor an output signal produced in response to a force applied to the top of the dome in a vertical direction ($F_Z$);

FIG. 7 is a graph illustrating the output signals from the west and east sides of the tactile sensor measured simultaneously for a force ($F_Z$) symmetrically applied to the top of the dome in the vertical or Z axis direction;

FIGS. 8A and 8B are respectively a cross-sectional view, and a top plan view of the tactile sensor of FIGS. 6A and 6B, showing a force applied laterally to the tactile sensor from the west side and directed toward the east side ($F_E$);

FIG. 9 is a graph showing output signals measured at the west end and at the east end for a force applied laterally at the west side and directed toward the east side of the tactile sensor of FIGS. 8A and 8B;

FIGS. 10A and 10B are respectively a cross-sectional view, and a top plan view of a tactile sensor comprising a Flemion™ ion-exchange membrane with plated electrodes configured so that when molded into a dome shape tactile sensor, the plated electrodes on the outer surface of the dome cover four separate circumferential quadrants;

FIG. 11 is a flow chart listing exemplary steps for creating a single tactile sensor in accord with the present novel approach;

FIG. 12 is a top plan view of a plurality of tactile sensors (e.g., like that of FIGS. 10A and 10B disposed in an array on an ion-exchange membrane, such as Flemion™;

FIG. 13A is a schematic drawing showing asymmetric force applied to the west side of the tactile sensor (e.g., like that of FIGS. 10A and 10*b*) at an incident angle θ relative to the horizontal (X) axis, so that the force is directed generally toward the east side along the horizontal axis;

FIG. 13B is an exemplary graph showing output signals at the four sides of the tactile sensor for a force applied as indicated in regard to FIG. 13A;

FIG. 13C is a graph showing an applied displacement caused by forces applied to the west side of the tactile sensor (like that of FIGS. 10A and 10B) at angles (relative to the horizontal or X axis) of 30°, 60°, and 90°, respectively, producing the output signals at the four sensing electrodes, as shown in FIGS. 13D, 13E, and 13F;

FIG. 14 is a cross-sectional view of a tactile sensor having a protective coating and optionally mounted on a flexible circuit (where the plan view is generally similar to that of FIG. 10B); and FIG. 15 is a flow chart that shows additional exemplary steps employed for producing an array of tactile sensors (e.g., as shown in FIG. 12).

DESCRIPTION

Figures and Disclosed Embodiments are Not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Early Tests of Flemion™ for Use in a Tactile Sensor

Figure 1:
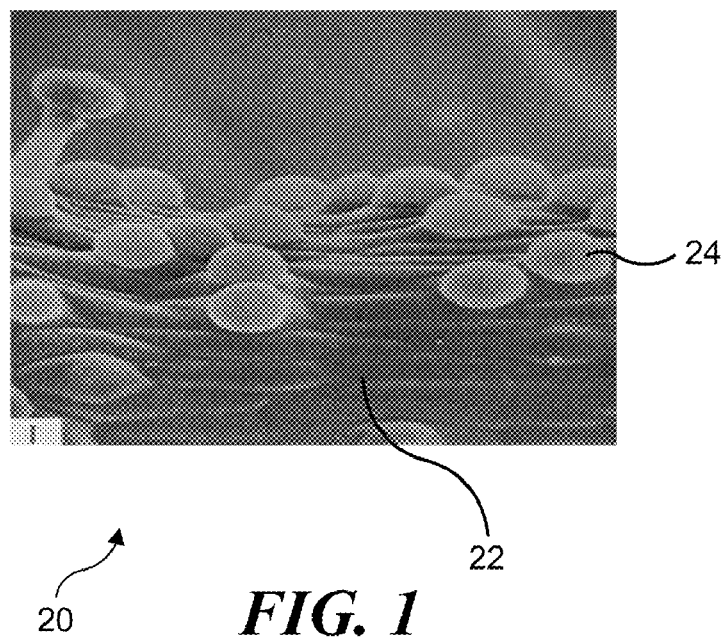
FIG. 1 is a scanning electron micrograph (390× magnification) of a ventral side of a *Cucurbita* tendril showing a trichome and several tactile papillae.
Figure 2:
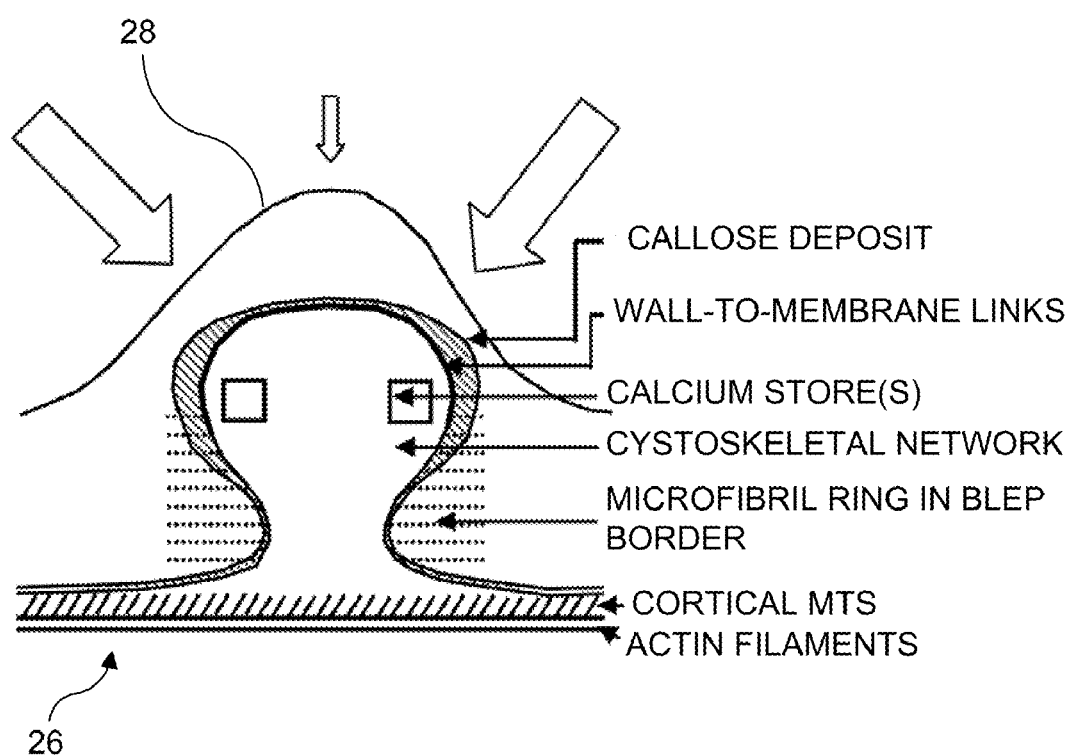
FIG. 2 illustrates a model showing the functional architecture of a tactile-bleb mechanoreceptor/mechanotransducer (representative of the tactile papillae of FIG. 1), where the open arrows indicate the relative sensitivity of the structure to mechanical stimulation, e.g., by application of a force that can be incident over a range of acute to obtuse angles.
Figure 3A:
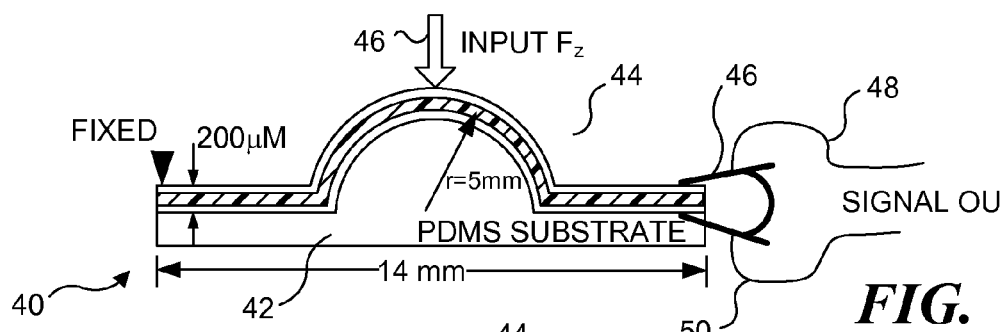
FIGS. 3A and 3B are respectively a cross-sectional view of a tactile sensor comprising a Flemion™ strip mounted on a dome-shaped polydimethylsiloxane (PDMS) substrate and a top plan view of the tactile sensor.
Figure 3B:
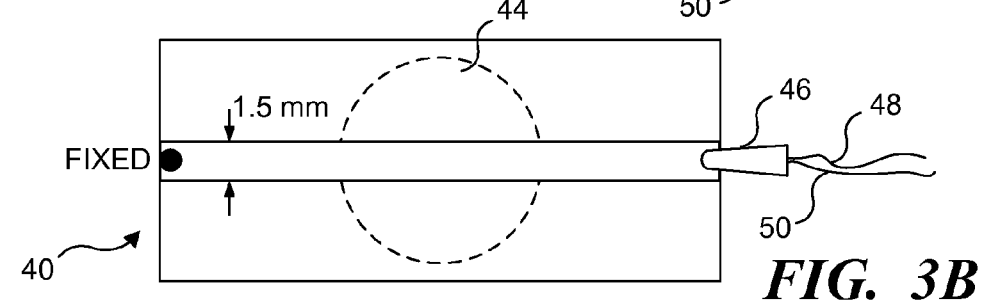

Initially, an attempt was made to design tactile sensors that are based on Nafion™, but more recently, Flemion™ was used for this purpose. In the present novel approach, both Nafion™ and Flemion™ have been used to fabricate tactile sensors having gold (Au) electrodes, as shown in FIGS. 8A and 8B (discussed below). A preliminary exemplary design of a tactile sensor 40 fabricated with Flemion™ is shown in FIGS. 3A and 3B. As shown therein, a rectangular Flemion™ strip 44 with Au plating on opposite surfaces is mounted on an elastomeric dome-shaped polydimethylsiloxane (PDMS) substrate 42. One end of the Au-plated Flemion™ strip and substrate is fixed, and at the other free end, a spring-loaded electrical clip attached to the Au plating electrodes formed on the opposite surfaces of the Flemion™ strip is coupled to electrical leads 48 and 50, which convey an output signal from the Flemion™ strip when a force 46 having a vertical component, $F_Z$, is applied vertically downwardly to the Flemion™ strip, where the strip passes over the top of the substrate dome.

Figure 4A:
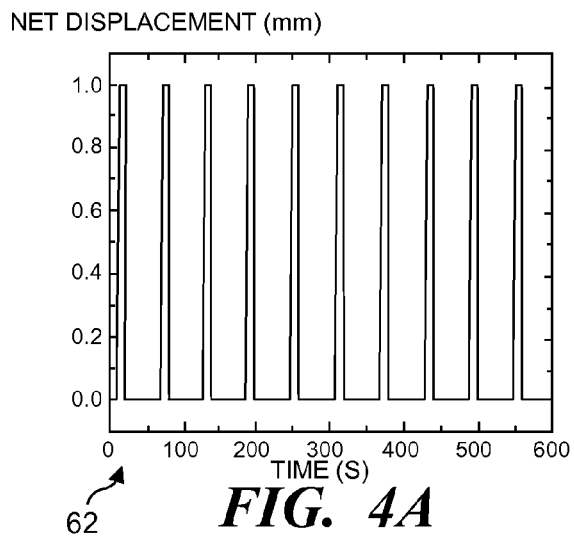
Figure 4B:
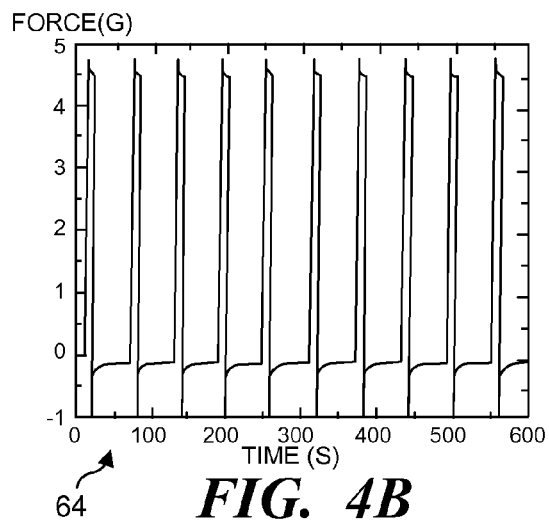
Figure 4C:
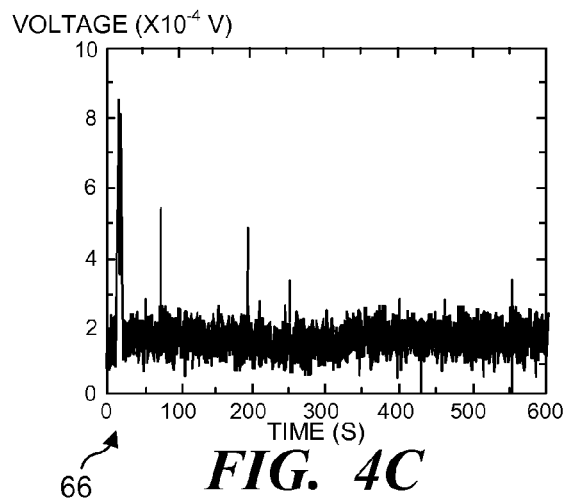
Figure 4D:
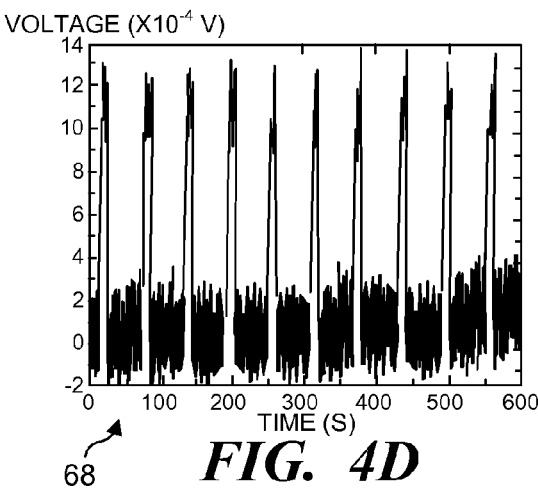

FIGS. 4A, 4B, and 4D show clearly that the strip of Flemion™ ion-exchange membrane in tactile sensor 40 exhibits strong output signals under an applied load (or displacement) and has good repeatability. A graph 62 in FIG. 4A shows the cyclic displacement of the Au-plated Flemion™ ion-exchange membrane over time in response to the cyclic application of the force, which is shown by a graph 64 in FIG. 4B. The output signal produced by the strip of Flemion™ membrane is shown in a graph 68 in FIG. 4D. In contrast, as shown in a graph 66 in FIG. 4C, a similar strip of Au-plated Nafion™ ion-exchange membrane that was used in the same configuration as shown for tactile sensor 40 exhibited a strong output signal level only for the first loading, but the output signals decayed quickly to nearly zero for the second and subsequent cyclic loadings by the applied vertical force.

A question arose in regard as to whether the superposition principle is valid for an inclined force directed onto the tactile sensor at an angle θ with regard to the perpendicular Z-axis. If so, the magnitude of the inclined force can be obtained by superposition of the force components indicated by the output signals for the X and Z axial directions, i.e., $F_x$ and $F_z$. Empirical data for output signals in response to application of an inclined force (θ=30°) are plotted in a graph 70 shown in FIG. 5, where the measured output signals relative $F_x$ and $F_z$ are shown, as well as the measured and the predicted results based on the superposition principle. A comparison between the measured and calculated signals over repeated sensing cycles demonstrates that the superposition principle seems to be valid for the response by the tactile sensor to forces applied at different angles.

The results shown in FIGS. 4A, 4B, 4D, and 5 led to the design of a new exemplary dome shaped tactile sensor 80 based on Flemion™, as shown in FIGS. 6A and 6B. In this tactile sensor a strip 82 of Au-plated Flemion™ ion-exchange membrane is supported by the convex dome of a flexible elastomeric PDMS substrate 84. At an east end of the strip (i.e., the right side of both FIGS. 6A and 6B), a spring-loaded clip 86 is attached to the Au electrode plated on opposite surfaces of the ion-exchange membrane, and an east signal out produced by the Flemion™ ion-exchange membrane is conveyed over leads 88 and 90 in response to an applied force acting to deflect or deform the tactile sensor. Similarly, at the west end of the strip (i.e., the left side of both FIGS. 6A and 6B), a spring-loaded clip 92 is attached to the Au electrodes plated on both surfaces of the strip of the ion-exchange membrane, so that a west signal out produced by the strip of the Flemion™ ion-exchange membrane is conveyed over leads 94 and 96 in response to a force acting to deflect or deform the tactile sensor.

The signals simultaneously measured at the west and east sides of the strip of Flemion™ ion-exchange membrane were plotted and compared as shown by a graph 100 in FIG. 7. These output signals are substantially identical and indicate that the signals show good coincidence when the applied force is symmetric relative to the signal collection sites disposed at opposite sides or ends of the tactile sensor. Thus, an applied force $F_Z$ acting on the center of the Au-plated strip of Flemion™ as shown in FIG. 6A will produce substantially identical east and west signals out, as confirmed in graph 100 of FIG. 7.

To investigate an asymmetrically applied force relative to different signal collection sites, the two signal collection sites that were used in evaluating the symmetrically applied force were maintained, but in this test, the force was applied to the strip comprising tactile sensor 80 at the west side of the dome, directed toward the east side, as shown by force vector arrow $F_E$ acting on tactile sensor 80 in FIGS. 8A and 8B. As shown in a graph 110 in FIG. 9, substantial differences were noted between the output signals at the west and east sides or ends of the tactile sensor, indicating that this prototype of the Flemion™-based tactile sensor could readily sense an applied force distribution or direction of the applied force, as was expected.

An improved exemplary embodiment of a tactile sensor 120 capable of sensing forces applied in orthogonally different directions, i.e., relative to the orthogonal X, Y, and Z axes was then created, as shown in FIGS. 10A and 10B. This sensor includes a dome 124 having patterned gold (Au) sensor electrodes 126, 128, 130, and 132 that are plated onto an outer surface of dome-shaped ion-exchange membrane 122, forming generally equal regions or segments J1, J2, J3, and J4 that are circumferentially spaced around the dome, and which are electrically separated from each other by slots 144 and 146. (An earlier exemplary embodiment (not shown) included a central electrode centered over the top of the dome, separated by an annular gap from four arcuate segments that extended circumferentially (but separated and electrically isolated from each other) around the lower portion of the dome. However, it was determined that this earlier design, although usable to produce discrete output signals indicative of a direction of an applied force, was not as effective as the sensor electrode pattern shown in FIGS. 10A and 10B.)

In tactile sensor 120, a base Au electrode is also plated on the concave undersurface of the ion-exchange membrane dome. An elastomeric PDMS substrate 136 having a matching dome shape, provides support for the electrodes and ion-exchange membrane. The substrate prevents a force applied against any of the patterned sensor electrodes from inverting the dome and provide a flexible support for the EAP. Not shown are electrical conductors that are attached to signal out tabs 136, 138, 140, and 142, which are respectively electrically coupled to patterned sensor electrodes 126, 128, 130, and 132. Another signal out tab (not shown) electrically connects the base electrode to an electrical conductor (also not shown), the electrical conductors can be coupled to a processor or other logic device to determine the direction of a force applied against the dome, based on the vector components represented by the output signals from the patterned sensor electrodes in response to the deformation of each segment of region caused by the applied force.

Exemplary Steps for Producing a Tactile Sensor

FIG. 11 is a flow chart 150 showing exemplary steps for producing a tactile sensor in accord with the present novel approach. In a step 152, a generally flat (i.e., a sheet) of an ion-exchange membrane with a selected cation is provided. For example the ion-exchange membranes discussed herein include Nafion™, which is a perfluorosulfonic acid membrane with a counter ion (such as $H^+$, $Li^+$, or $Na^+$) and Flemion™, which is a perfluorinated carboxylic acid membrane within a sodium salt. However, it is not intended that the ion-exchange membranes that might be used for this purpose in any way be limited only to these specific examples, since it is contemplated that other suitable ion-exchange membranes can instead be used. A step 154 provides for plating patterned Au electrodes on both sides of the ion-exchange membrane to form an EAP membrane. The plating can be done using, for example, silicon stencil masks, or other suitable masks that define the pattern of the sensor electrodes (and base electrode, if it is to be formed in a desired pattern also). Such masks are well known in the electronic arts for producing patterns of conductive traces on circuit boards and other components. Further details of the plating process are discussed below. As an alternative to defining the pattern of the four discrete sensing electrodes that cover different segments or regions of the dome-shaped ion-exchange membrane (that will be subsequently molded) using a stencil mask, a single sensing electrode can be initially plated on the outside of the ion-exchange membrane, and a laser or other suitable means can be employed to cut X-configuration diagonal slots 144 and 146 (shown in FIG. 10B) separating the four sensing electrodes electrically from each other.

In a step 156, the EAP membrane that is patterned with the electrodes is next placed into a single dome mold that includes a convex under surface and a corresponding concave upper surface, both of which are of a generally hemispherical or dome shape. The EAP membrane with the patterned electrodes is then molded by applying pressure forcing both sides of the mold toward each other with the EAP membrane disposed between the two sides and heating the mold to an elevated temperature in a step 158. The pressure provided by the mold, along with its shape and heat, forms the EAP membrane into a dome shape like that of the mold. The EAP membrane that has thus been molded is cured in a step 160. Next, in a step 162, the EAP membrane is immersed in a selected solvent, for example, an organic solvent that is chosen to improve the performance and durability of the tactile sensor in a dry environment. A step 164 then provides for producing vias (i.e., orifices) through the EAP membrane (and an elastomeric substrate that is provided to support the EAP and to prevent an applied force from inverting the dome). These vias and other conductive lines are filled with Au (or some other suitable conductor). A step 166 bonds the Au (or other suitable conductor) to wires to provide circuit paths for conveying the output signals produced by the sensing electrodes from the tactile sensor for further external use and processing, e.g., processing by a computer or other logical processing device.

While not required for all applications, a step 168 next encapsulates the tactile sensor in a biocompatible protective coating, so that it can be used in applications where it is implanted in a patient's body, or remains in contact with biological tissue for an extended period of time. The protective coating prevents the tissue from being adversely affected by exposure to the tactile sensor and also enhances the durability of the tactile sensor, particularly when the tactile sensor is used in dry (non-aqueous) environments.

Further Details of the Steps Used to Produce a Tactile Sensor

As noted above, Flemion™ shows improved performance as a basic tactile sensor (and actuator) material compared with Nafion™ due to its higher ion exchange capacity and good mechanical strength. A method was developed to obtain a higher ion exchange characteristic and improve the durability of tactile sensors produced using Flemion™. In order to improve the durability of Flemion™ sensors, a non-aquatic solution can be used as an electrolyte for Flemion™ tactile sensors instead of the typical aqueous electrolyte. Introduction of non-aqueous electrolyte solution (BMI-BF4) and an organic solvent into the Flemion™ ion-exchange membrane makes the material much more durable when used in a non-aqueous environment. This is one of two key concepts for improving the durability of the Flemion™ tactile sensor; the other method of increasing the durability is to use protective coating to reduce the drying of the ion-exchange membrane when used for an extended period in a relatively dry environment, which eventually will degrade its performance.

In order to produce a good EAP tactile sensor, it is desirable to employ highly conductive soft gold electrodes with a large fractal microstructure. These Au electrodes should be deposited on the membrane so as to achieve two goals, including a strong mechanical bonding between the Flemion™ ion-exchange membrane and the Au electrodes, and intensifying the effective electric field by reducing the net thickness of the Flemion™ ion-exchange membrane. Such a fractural structure has been successfully produced both in Nafion™ and Flemion™ EAPs. The impregnation-reduction technique used for plating the Au onto the ion-exchange material requires exchange of a gold complex and reduction by gradual sodium sulfite additions, as described below.

The gold is deposited on the surfaces of a Flemion™ ion-exchange membrane by the impregnation-reduction technique through the following process, which has been developed in the prior art. In this process, a gold complex [Au(Phen)Cl$_2$]$^+$ is first introduced into the Flemion™ membrane via ion exchanging with $K^+$. This process will take place if the amount of gold complex in the exchange solution is sufficient to drive the exchange and if the affinity of the Flemion™ m membrane for its present cation is not too high. Next, the Flemion™ membrane with the gold complex is immersed in de-ionized water to carry out a reduction process. A small amount of 5 wt % sodium sulfite solution is gradually added to the reducing bath, and the temperature is carefully controlled to slowly ramp up from about 40° C. to about 70° C. For a thin Flemion™ membrane with a thickness of about 145 µm, the reduction process normally takes about six hours, followed by rinsing the membrane in acid and de-ionized water for cleaning. Finally, the Flemion™ sample is immersed in 1 mol/L KOH solution to again promote ion exchange, completing one cycle of gold plating. The gold plating process can be repeated for six to eight times in order to obtain a thicker conductive electrode layer with a microstructure of highly three-dimensional (3-D) fractal geometry microstructure. The 3-D fractal geometry of the Au electrodes is one of the key ways to achieve a longer useable lifetime for the Flemion™ EAP when used for either an actuator or a tactile sensor.

The amount of gold that is deposited during the plating process is very different for ion-exchange membranes having different thicknesses. The depth of the fractal structure of the Au within the ion-exchange membrane is controlled by the plating conditions (temperature, concentration) and not by the amount of gold used. In preparing a sheet of Flemion™ ion-exchange membrane for producing an array of tactile sensors (or a single such sensor), a protective photo epoxy, such as an SU8 layer can be spin coated onto the sheet of the Flemion™ membrane and can be photo-polymerized to produce a transparent thin film using UV-lithography, producing a pattern that is identical to the desired Au electrode pattern. The polymer layer will prevent Au depositing on areas surrounding the location of each dome in order to achieve a clear array of dome shapes during the Au electrode patterning. The entire SU8 patterned Flemion™ sheet can then be immersed in a reducing solution. To avoid the protective polymer SU8 film detaching from the Flemion™, an adhesion promoter, such as hexamethyldisilazane can be used. An alternative option is to use an epoxy molecule having methyl groups on one side that adhere to the Flemion™ membrane, and having an epoxy group that reacts with SU8 on the other side of the molecule.

The impregnation reduction technique described successfully yields flexible, highly conductive Au electrodes on Flemion™. In the ion exchange step, potassium ions (K+) have been shown to have the highest exchange ratio with the gold complex. The amount of reducing agent present in the reducing bath below and at 60° C. seems to govern the growth of the Au fractal structure within the ion-exchange membrane surface. The resulting Flemion™/gold composite shows a fast actuation in the sodium form, with no relaxation. The gold plating process to produce electrodes for both single and arrays of the dome-shaped tactile sensors on a sheet of Flemion™ ion-exchange membrane is substantially the same. A protective polymer thin film is subsequently deposited on the array of dome-shaped tactile sensors (or on a single tactile sensor if not used in an array), to enhance the durability of the tactile sensor (and to promote biocompatibility if a biocompatible protective film is employed).

Array of Tactile Sensors

Having achieved a single dome-shaped tactile sensor, e.g., one based on Flemion™, the next step in the further development of this novel technology was to extend the concept to arrays of tactile sensor domes covering a larger area, as shown in FIG. 12. Using such an array 170 of tactile sensor domes 124 that are spaced apart over the surface of a flexible EAP membrane 172, it is contemplated that artificial skin with tactile sensing ability might be achieved, which could be an important potential application for this concept. The array of tactile sensors can be used to sense a shape of an object that contacts specific ones of the tactile sensors, by enabling the vector force applied by the object on each such tactile sensor to be determined. Thus, instead of merely responding to a pressure applied to each tactile sensor by an object, the array can provide a plurality of output signals from each tactile sensor dome 124 that indicate the direction of the force applied by the object, to reveal much more detail about the object and its shape or even its surface.

FIGS. 13A and 13B illustrate an asymmetric force applied to the west side of tactile sensor 120 (shown in FIGS. 10A and 10B) and the resulting output signal from the sensor electrodes at each of the four sides of the tactile sensor. In FIG. 13A, a schematic diagram 180 illustrates an asymmetric force 182 being applied on the west side at an angle θ relative to a horizontal X axis and generally directed toward the east side of the tactile sensor. FIG. 13B illustrates a graph 190 showing the output voltages from the four sensor electrodes of tactile sensor 120. It will be apparent that the applied force acting primarily on the west sensing electrode causes it to produce the maximum output signal.

FIG. 13C illustrates a graph 192 showing the applied displacement of the tactile sensor dome resulting from a force applied to the west side of tactile sensor 120. This force is applied at three different angles relative to the horizontal or X axis, including 30°, 60°, and 90°. The output signals for each of the four sensing electrodes on the west, north, south, and east sides of the tactile sensor dome of tactile sensor 120 are illustrated in graphs 194, 196, and 198 shown in FIGS. 13D, 13E, and 13F, for these respective angles. Accordingly, it will be evident that the output signals from all four sensing electrodes should be usable to determine the actual vector direction of an applied force and its relative magnitude.

Further refinements included in yet another exemplary embodiment of a tactile sensor 200 are illustrated in FIG. 14. Like the exemplary embodiment of tactile sensor 120, this embodiment includes a dome 202 that is produced by molding an EAP membrane comprising an ionic polymer (i.e., an ion-exchange membrane) 204 after Au sensor electrodes 206 (e.g., with at least four discrete sensing electrodes) and an Au base electrode 208 have been plated on opposite surfaces of the ion-exchange membrane. A flexible polymer substrate 210 supports the undersurface of the EAP membrane to maintain the convex shape of dome 202. A protective polymer coating 212 is applied to encapsulate tactile sensor 200 (or at least its exposed outer surface). Depending on the intended application of tactile sensor 200, the polymer coating can be selected to be biocompatible, so that the tactile sensor can be used internally within a biological body or exposed to biological tissue without adverse effects. Vias 214 (not all shown) couple each of the Au sensor electrodes to separate flexible conductive traces 216 that are provided on a flexible circuit 218. These conductive traces separately convey the output signals from each sensor electrode from the tactile sensor they can be used or further processed. It will be appreciated that although only a single tactile sensor 200 is shown in FIG. 14, a plurality of such sensors can be included in an array generally similar to that shown in FIG. 12, as discussed above. The steps employed for producing such an array are discussed below.

Exemplary Steps for Creating an Array of Tactile Sensors

FIG. 15 is a flowchart 220 showing exemplary steps that can be used for producing an array of tactile sensors, such as tactile sensors 200. In a step 222, an EAP membrane is provided with arrayed Au electrode patterns (e.g., rectangles) plated on both sides (as discussed above). A step 224 provides for separating the Au electrode that will cover each dome into four separate sensing electrodes by creating the slots between the four sensing electrodes. In a step 226, the Au patterned EAP membrane is positioned in a dome array mold having concave dome cavities on one side and corresponding dome convex projections on the opposite side, so that each of the patterned sensing electrodes are centered over a dome concave/convex portion of the mode. The EAP membrane is then molded to form the dome shapes for each tactile sensor in the array, by applying pressure and heating the mold to an appropriate elevated temperature, in a step 228. A step 230 provides for curing the EAP membrane that is thus molded. Next, a step 232 uses the procedure discussed above for FIG. 11, steps 164-168 (for the single dome tactile sensor) to finish the process.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A tactile sensor capable of determining a direction from which a force is applied, comprising:
    (a) an electroactive polymer comprising:
        (i) an ion-exchange membrane formed into a convex dome having an outer surface and an inner surface;
        (ii) a plurality of flexible electrodes disposed on the outer surface of the ion-exchange membrane, so that each of the plurality of flexible electrodes covers a different circumferential segment of the outer surface of the convex dome; and
        (iii) a base flexible electrode disposed on the inner surface of the ion-exchange membrane;
    (b) a plurality of electrical conductors that are electrically connected to the plurality of flexible electrodes and to the base flexible electrode to convey output signals from the plurality of flexible electrodes and the base flexible electrode, wherein distortion of a segment of the ion-exchange membrane caused by a force applied to the flexible electrode covering the segment causes the segment of the ion-exchange membrane to produce an output signal indicative of a magnitude of the force, wherein relative differences in the output signals conveyed from the flexible electrodes covering the different segments of the convex dome are further indicative of a direction of the force acting on the tactile sensor; and
    (c) an elastomeric support disposed within a concave cavity formed under the convex dome, the elastomeric support preventing a force applied against one or more of the plurality of flexible electrodes from inverting the ion-exchange membrane.

2. The tactile sensor of claim 1, wherein the elastomeric support comprises a poly(dimethyl siloxane) substrate.

3. The tactile sensor of claim 1, wherein the ion-exchange membrane consists of a membrane selected from the group consisting of:
    (a) a perfluorinated carboxylic acid membrane within a sodium salt; and
    (b) a perfluorosulfonic acid membrane with a counter ion.

4. The tactile sensor of claim 1, wherein the plurality of flexible electrodes and the base flexible electrode comprise a metallic film that is substantially chemically inert and which is plated onto the outer surface and the inner surface of the ion-exchange membrane.

5. The tactile sensor of claim 4, wherein the metallic film is bonded to the ion-exchange membrane by forming a fractal microstructure of the metallic film within the surfaces of the ion-exchange membrane.

6. The tactile sensor of claim 1, further comprising a flexible protective coating applied over the plurality of flexible electrodes, to enhance a durability of the tactile sensor.

7. The tactile sensor of claim 6, wherein the protective coating comprises a polymer film that is biocompatible.

8. The tactile sensor of claim 1, wherein the tactile sensor comprises one of a plurality of substantially identical tactile sensors that are disposed in an array of tactile sensors on a supporting substrate.

9. The tactile sensor of claim 8, further comprising vias that electrically couple the plurality of flexible electrodes and the base flexible electrode for each of the plurality of tactile sensors to a flexible circuit disposed adjacent to the supporting substrate.

10. The tactile sensor of claim 1, wherein the ion-exchange membrane includes an organic solvent and a non-aqueous electrolyte, to extend a usable lifetime of the tactile sensor in a substantially dry environment.

11. The tactile sensor of claim 1, wherein the ion-exchange membrane is characterized by producing a generally consistent and repeatable output signal in response to cyclically repetitive applications of a force deflecting the electroactive polymer.

12. The tactile sensor of claim 1, wherein the ion-exchange membrane is characterized by producing a substantially constant magnitude output signal for a substantially constant force applied to deflect the electroactive polymer.

13. A method for producing a tactile sensor that enables a direction in which a force is applied to the tactile sensor to be determined, comprising the steps of:
    (a) applying flexible electrodes on opposite first and second surfaces of an ion-exchange membrane and configuring each flexible electrode defined on the first surface of the ion-exchange membrane to cover each of a plurality of different regions, forming an electroactive polymer;
    (b) molding the electroactive polymer to form a convex dome in which the plurality of different regions covered by the plurality of flexible electrodes comprise different circumferential segments arranged radially around the convex dome;
    (c) connecting electrical conductors to the plurality of the flexible electrodes on the first surface of the ion-exchange membrane and to a flexible electrode on the second surface of the ion-exchange membrane, the electrical conductors being operative to convey output signals from the different circumferential segments in response to a deformation of a circumferential segment by a force applied against the convex dome; and
    (d) providing a generally dome-shaped elastomeric support underlying the convex dome and the flexible electrode covering the second surface of the ion-exchange membrane, the elastomeric support preventing the ion-exchange membrane from inverting when a force is applied to the convex dome.

14. The method of claim 13, further comprising the step of applying a flexible biocompatible protective coating over the tactile sensor, enabling the tactile sensor to remain in contact with tissue without adversely affecting the tissue, and enhancing a durability of the tactile sensor.

15. The method of claim 13, wherein the step of providing the elastomeric support comprising comprises the step of molding the support from poly(dimethyl siloxane).

16. The method of claim 13, further comprising the step of employing an ion-exchange polymer to fabricate the ion-exchange membrane, where the ion-exchange polymer is selected from the group consisting of:
    (a) a perfluorinated carboxylic acid membrane within a sodium salt; and
    (b) a perfluorosulfonic acid membrane with a counter ion.

17. The method of claim 13, wherein the step of applying the flexible electrodes comprises the step of plating a substantially chemically inert metallic film onto the first surface and onto the second surface of the ion-exchange membrane.

18. The method of claim 17, further comprising the step of employing a pattern stencil to define the different regions where the conductive metallic film is plated onto the first surface of the ion-exchange membrane to form the flexible electrodes.

19. The method of claim 17, further comprising the step of bonding the metallic film to the ion-exchange membrane by forming a fractal microstructure of the metallic film within the first and second surfaces of the ion-exchange membrane.

20. The method of claim 17, wherein the different regions are defined by cutting slots through the metallic film comprising each of the flexible electrodes after the conductive metal is applied to the first surface of the ion-exchange membrane, the slots electrically separating the flexible electrodes covering the different regions of the ion-exchange membrane, which comprise the different circumferentially arranged segments of the convex dome.

21. The method of claim 13, wherein the step of molding the electroactive polymer comprises the steps of:
(a) positioning the electroactive polymer within a mold between a first mold surface having a convex shape and an opposite second mold surface having a corresponding concave shape; and
(b) applying pressure against the mold, while heating the mold, so that the first and the second mold surfaces are forced toward each other to shape the electroactive polymer into the convex dome shape.

22. The method of claim 13, further comprising the step of similarly fabricating a plurality of spaced-apart tactile sensors on the same ion-exchange membrane, forming an array of the tactile sensors on a supporting elastomeric substrate.

23. The method of claim 22, wherein for each of the plurality of tactile sensors, the step of forming electrical connectors comprises the step of forming vias that electrically couple the plurality of flexible electrodes on the first surface with a flexible circuit disposed adjacent to the supporting elastomeric substrate.

24. The method of claim 13, further comprising the step of creating the ion-exchange membrane with an organic solvent and a non-aqueous electrolyte, to extend a usable lifetime of the tactile sensor in a substantially dry environment.

25. A method for sensing a direction in which a force is applied to a tactile sensor, comprising the steps of:
(a) providing a generally dome-shaped tactile sensor having a plurality of sensing regions disposed around the surface of the dome-shaped tactile sensor, each sensing region producing an output signal indicative of a deformation of the sensing region caused by a vector component of an applied force;
(b) automatically processing the output signals to determine the direction in which the force was applied to the dome-shaped tactile sensor; and
(c) providing an elastomeric material disposed under the dome-shaped tactile sensor for preventing the generally dome-shaped tactile sensor from inverting when it is deformed by an applied force.

26. The method of claim 25, further comprising the step of providing a biocompatible coating over the tactile sensor to enable it to remain in contact with biological tissue without adversely affecting the tissue.

27. The method of claim 25, further comprising the step of providing an array comprising a plurality of the tactile sensors formed from a sheet of an electroactive polymer, to sense a force acting on a specific one or more of the plurality of tactile sensors.

28. The method of claim 25, wherein the step of producing the output signals comprises the step of using an electroactive polymer that generates a voltage when deformed by a force for the tactile sensor, each sensing region including different electrodes covering different portions of a surface of an ion-exchange membrane comprising the electroactive polymer.

29. A tactile sensor array that is able to determine a direction in which a force is applied to stimulate the tactile sensor, comprising:
(a) an electroactive polymer comprising a plurality of generally hemispherical shaped elements, each hemispherical element being divided into a plurality of different sensing regions that each produce a separate output signal when deformed by a force acting on the sensing region;
(b) electrical conductors coupled to each of the sensing regions of the hemispherical shaped elements, for conveying the output signal produced by each to a processor that can determine a direction of the force applied to the tactile sensor array as a function of one or more vector components of the force applied to one or more of the regions comprising the hemispherical-shaped elements; and
(c) an elastomeric substrate supporting the plurality of generally hemispherically-shaped elements, preventing them from being inverted by an applied force.

30. The tactile sensor array of claim 29, wherein at least a portion of the electrical conductors are defined by a flexible circuit that is disposed below an undersurface of the tactile sensor array.

31. A biocompatible tactile sensor that is able to remain continuously in contact with biological tissue without adversely affecting the biological tissue, comprising:
(a) a sheet of an electroactive polymer formed to include a protuberance that extends outwardly from a surface of the sheet, the electroactive polymer including a plurality of electrodes covering different sensing regions around the protuberance, each sensing region producing an output signal indicating a magnitude of a force acting to displace the sensing region by deforming the protuberance;
(b) electrical conductors that are coupled to the electrodes of the sensing regions and which convey the output signals from each sensing region;
(c) a protective coating applied to the sheet of electroactive polymer, the protective coating being biocompatible to enable the electroactive polymer to contact biological tissue without adversely affecting the biological tissue; and
(d) an elastomeric flexible support for the protuberance that prevents the protuberance from being inverted by a force that is applied to one or more sensing regions.

32. The biocompatible tactile sensor of claim 31, further comprising a plurality of protuberances formed in the sheet of the electroactive polymer and disposed in an array to sense a force applied against one or more of the protuberances.

33. The biocompatible tactile sensor of claim 31, wherein the output signal from one or more of the sensor regions of the protuberance are indicative of vector components of the force applied to the protuberance and are thus indicative of a direction of the applied force.

\* \* \* \* \*